United States Patent
Kim et al.

(10) Patent No.: US 12,418,395 B2
(45) Date of Patent: Sep. 16, 2025

(54) TRANSCEIVER, METHOD OF DRIVING THE SAME, AND DISPLAY DEVICE

(71) Applicant: Samsung Display Co., Ltd., Yongin-si (KR)

(72) Inventors: Hyunsu Kim, Hwaseong-si (KR); Jundal Kim, Asan-si (KR); Jongman Bae, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/072,058

(22) Filed: Nov. 30, 2022

(65) Prior Publication Data

US 2023/0239133 A1 Jul. 27, 2023

(30) Foreign Application Priority Data

Jan. 21, 2022 (KR) ........................ 10-2022-0009027

(51) Int. Cl.
*H04L 7/04* (2006.01)
*G06F 3/147* (2006.01)
*G09G 3/20* (2006.01)

(52) U.S. Cl.
CPC .............. *H04L 7/048* (2013.01); *G06F 3/147* (2013.01); *G09G 3/20* (2013.01); *H04L 7/041* (2013.01); *G09G 2370/04* (2013.01); *G09G 2370/10* (2013.01)

(58) Field of Classification Search
CPC ......... H04L 7/048; H04L 7/041; G06F 3/147; G09G 3/20; G09G 2370/04; G09G 2370/10
See application file for complete search history.

(56) References Cited

U.S. PATENT DOCUMENTS

| | | | |
|---|---|---|---|
| 9,143,272 B2 | 9/2015 | Chen et al. | |
| 2012/0105112 A1* | 5/2012 | Davis | G06F 11/1604 327/142 |
| 2014/0380136 A1* | 12/2014 | Ok | G06F 11/1004 714/807 |
| 2015/0160906 A1* | 6/2015 | Hwang | G09G 5/006 345/520 |
| 2016/0125794 A1* | 5/2016 | Park | G09G 3/2096 345/522 |
| 2017/0123470 A1* | 5/2017 | Srivastava | G06F 1/266 |
| 2020/0193884 A1* | 6/2020 | Kim | G09G 3/006 |
| 2020/0210110 A1* | 7/2020 | Richter | G11C 7/22 |

(Continued)

FOREIGN PATENT DOCUMENTS

| | | |
|---|---|---|
| KR | 1020150066659 A | 6/2015 |
| KR | 1020160073295 A | 8/2017 |

(Continued)

*Primary Examiner* — Sujit Shah
(74) *Attorney, Agent, or Firm* — CANTOR COLBURN LLP

(57) ABSTRACT

A transceiver includes a transmitter which transmits clock-embedded data through a line, where the clock-embedded data includes a clock training pattern, a start pattern, an encoded payload, and an end pattern, and a receiver which receives the clock-embedded data through the line, detects a clock embedding-related error from the clock-embedded data, and outputs an error flag corresponding to the clock embedding-related error to the transmitter.

20 Claims, 9 Drawing Sheets

(56) References Cited

U.S. PATENT DOCUMENTS

2020/0349879 A1\* 11/2020 Park .................... G09G 3/3233
2021/0320783 A1\* 10/2021 Masuda ................ H04L 7/0012
2021/0383770 A1\* 12/2021 Chen ..................... G09G 5/008

FOREIGN PATENT DOCUMENTS

| KR | 1020170106605 A | 9/2017 |
| KR | 1020150055250 A | 10/2019 |

\* cited by examiner

FIG. 4

| bit | Description |
|---|---|
| 0 | SoT Error |
| 1 | SoT Sync Error |
| 2 | EoT Sync Error |
| 3 | Escape Mode Entry Command Error |
| 4 | Low Power Transmit Sync Error |
| 5 | Peripheral Timeout Error |
| 6 | False Control Error |
| 7 | Contention Detected |
| 8 | Ecc Error, single-bit(detected, not corrected) |
| 9 | Ecc Error, multi-bit(detected, not corrected) |
| 10 | Checksum Error(Long packet only) |
| 11 | DSI Data Type Not Recognized |
| 12 | DSI VC ID Invalid |
| 13 | Invalid Transmission Length |
| 14 | Reserved |
| 15 | DSI Protocol Violation |

FIG. 5

| Name | Description |
|---|---|
| Loss of Lock Error | State in which a CDR circuit is out of a locked state without normally restoring a clock signal during anHSDT operation |
| Initialization Error | State in which the CDR circuit is not normally locked even though the CDR circuit has terminated an initialization operation based on a clock training pattern |
| STP Error | Case in which a start pattern is not normally input |
| EDP Error | Case in which an end pattern is not normally input |
| Encoding Key Error | Case in which an input encoding key is a prohibited pattern that may not be generated based on an encoding protocol |

| Name | Error Detection | Masking | Output of Error Flag |
|---|---|---|---|
| Loss of Lock Error | O | O | X |
| Initialization Error | O | X | O |
| STP Error | X | X | X |
| EDP Error | X | X | X |
| Encoding Key Error | X | O | X |

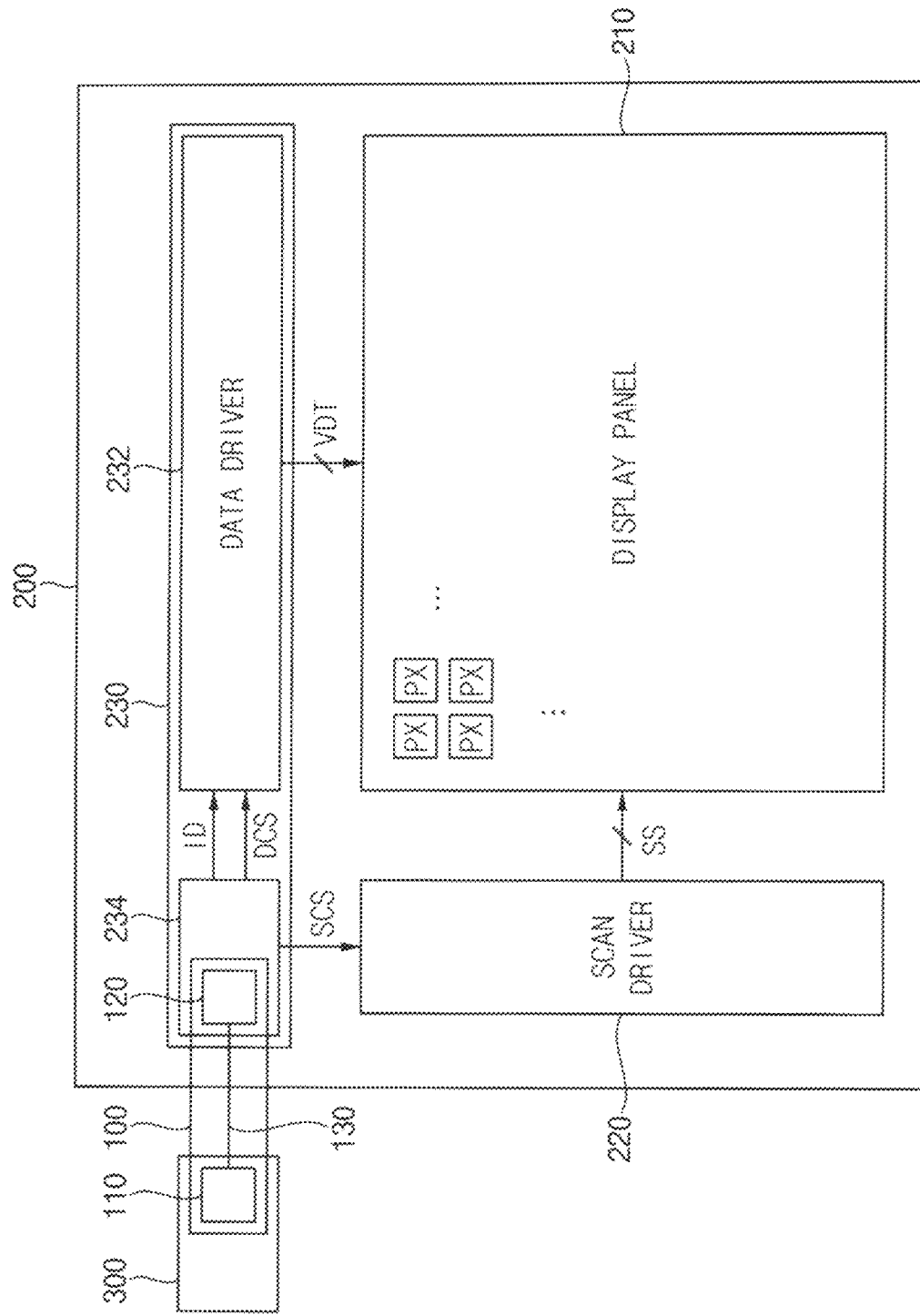

TRANSCEIVER, METHOD OF DRIVING THE SAME, AND DISPLAY DEVICE

This application claims priority to Korean Patent Application No. 10-2022-0009027, filed on Jan. 21, 2022, and all the benefits accruing therefrom under 35 USC § 119, the content of which in its entirety is herein incorporated by reference.

BACKGROUND

1. Field

Embodiments relate to a transceiver. More particularly, embodiments related to a transceiver, a method of driving the transceiver, and a display device.

2. Description of the Related Art

In general, a display device may communicate with a processor by using a mobile industry processor interface (MIPI) protocol. While performing the communication by using the MIPI protocol, a data line for transmitting data and a clock line for transmitting a clock signal may be used.

SUMMARY

When performing a communication between a display device and a process by using a MIPI protocol, a use of a clock line may cause an increase in a physical or spatial cost and an increase in power consumption. Accordingly, a clock-embedded data scheme for transmitting clock information through the data line without the clock line may be used to prevent the increase in the physical or spatial cost and the increase in the power consumption caused by the use of the clock line. However, in the clock-embedded data scheme, handling of a clock embedding-related error (error detection, error transmission, etc.) may be desired.

Embodiments provide a transceiver, a method of driving the transceiver, and a display device in which a clock embedding-related error is handled.

A transceiver according to embodiments includes a transmitter which transmits clock-embedded data through a line, where the clock-embedded data includes a clock training pattern, a start pattern, an encoded payload, and an end pattern, and a receiver which receives the clock-embedded data, detects a clock embedding-related error from the clock-embedded data, and outputs an error flag corresponding to the clock embedding-related error to the transmitter.

In an embodiment, the clock embedding-related error may not be included in an error defined in a mobile industry processor interface (MIPI) D-PHY & DSI standard specification.

In an embodiment, the clock embedding-related error may include at least one selected from a loss-of-lock error, an initialization error, a start pattern error, an end pattern error, and an encoding key error.

In an embodiment, the at least one selected from the loss-of-lock error, the initialization error, the start pattern error, the end pattern error, and the encoding key error may be selectively masked.

In an embodiment, the receiver may include a reception unit which samples the clock-embedded data to generate first encoded data and a control signal, a decoder which decodes the first encoded data to generate first data, a reception controller which receives the control signal and the first data, and a main controller which outputs the error flag.

In an embodiment, the reception unit and the decoder may detect the clock embedding-related error.

In an embodiment, the clock embedding-related error detected by the reception unit may be transmitted to the main controller through the reception controller, and the clock embedding-related error detected by the decoder may be transmitted to the main controller through the reception unit and the reception controller.

In an embodiment, the clock embedding-related error detected by the reception unit may be directly transmitted to the main controller, and the clock embedding-related error detected by the decoder may be transmitted to the main controller through the reception unit.

In an embodiment, the transmitter may include a transmission controller which generates second data, an encoder which encodes the second data to generate second encoded data, and a transmission unit which generates the clock-embedded data based on the second encoded data.

In an embodiment, the error flag may include one of a pulse of a high voltage level, a pulse of a low voltage level, a signal increasing from the low voltage level to the high voltage level, and a signal decreasing from the high voltage level to the low voltage level.

In an embodiment, a width of the pulse of the high voltage level and a width of the pulse of the low voltage level may be selectively adjusted.

In an embodiment, the receiver may generate a clock signal by using the clock training pattern and the encoded payload.

A method of driving a transceiver according to embodiments includes transmitting, by a transmitter, clock-embedded data through a line to a receiver, where the clock-embedded data includes a clock training pattern, a start pattern, an encoded payload, and an end pattern, detecting a clock embedding-related error from the clock-embedded data, and outputting, by the receiver, an error flag corresponding to the clock embedding-related error to the transmitter.

In an embodiment, the clock embedding-related error may include at least one selected from a loss-of-lock error, an initialization error, a start pattern error, an end pattern error, and an encoding key error.

In an embodiment, the method may further include selectively masking the at least one selected from the loss-of-lock error, the initialization error, the start pattern error, the end pattern error, and the encoding key error.

In an embodiment, the error flag may include one of a pulse of a high voltage level, a pulse of a low voltage level, a signal increasing from the low voltage level to the high voltage level, and a signal decreasing from the high voltage level to the low voltage level.

In an embodiment, the method may further include selectively adjusting a width of the pulse of the high voltage level and a width of the pulse of the low voltage level.

In an embodiment, the method may further include transmitting, by the transmitter, a reset signal to the receiver based on the error flag.

A display device according to embodiments may include a display panel including a plurality of pixels, a display panel driver including a data driver which provides data voltages to the pixels, and a timing controller which controls driving of the data driver, and a receiver which receives clock-embedded data, detects a clock embedding-related error from the clock-embedded data, and outputs an error flag corresponding to the clock embedding-related error, where the clock-embedded data includes a clock training pattern, a start pattern, an encoded payload, and an end pattern.

In an embodiment, the display panel driver may be a timing controller-embedded driver (TED) in which the timing controller is embedded in the data driver, and the display panel driver may include the receiver.

In the transceiver, the method of driving the transceiver, and the display device according to the embodiments, the clock embedding-related error may be detected from the clock-embedded data, and the error flag corresponding to the clock embedding-related error may be output, so that the clock embedding-related error, which is not included in errors defined in the MIPI D-PHY & DSI standard specification, may be effectively handled.

BRIEF DESCRIPTION OF THE DRAWINGS

Illustrative, non-limiting embodiments will be more clearly understood from the following detailed description taken in conjunction with the accompanying drawings.

FIG. 4 is a table showing errors defined in an MIPI D-PHY & DSI standard specification.

FIG. 5 is a table showing clock embedding-related errors.

FIG. 11 is a block diagram showing a display device and a processor according to an embodiment of the disclosure.

DETAILED DESCRIPTION

Figure 1:
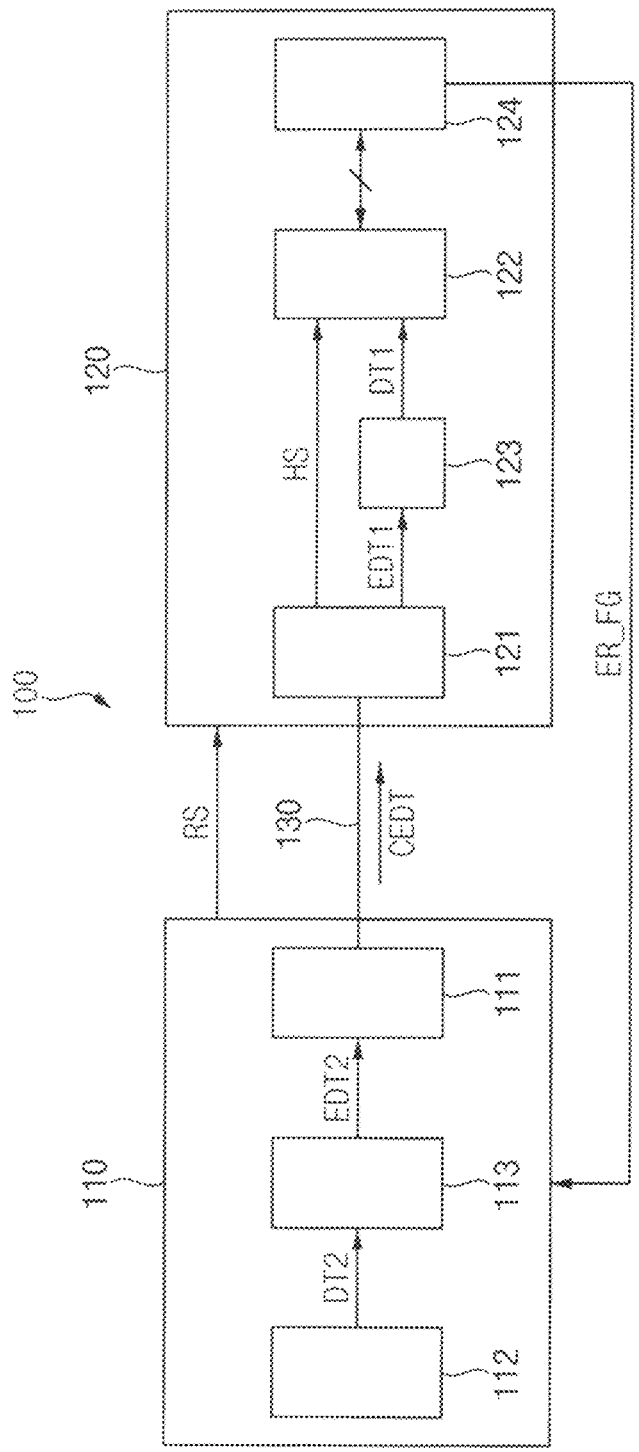
FIG. 1 is a block diagram showing a transceiver according to an embodiment of the disclosure.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinafter, a transceiver, a method of driving the transceiver, and a display device according to embodiments of the disclosure will be described in detail with reference to the accompanying drawings.

FIG. 1 is a block diagram showing a transceiver 100 according to an embodiment of the disclosure.

Referring to FIG. 1, an embodiment of a transceiver 100 may include a transmitter 110, a receiver 120, and a line 130.

The transmitter 110 may transmit clock-embedded data CEDT, which includes a clock training pattern, a start pattern, an encoded payload, and an end pattern, through the line 130. The receiver 120 may receive the clock-embedded data CEDT, detect a clock embedding-related error from the clock-embedded data CEDT, and output an error flag ER_FG corresponding to the clock embedding-related error to the transmitter 110. The transmitter 110 may transmit a reset signal RS to the receiver 120 based on the error flag ER_FG.

An embodiment of the transmitter 110 may include a transmission unit 111, a transmission controller 112, and an encoder 113. An embodiment of the receiver 120 may include a reception unit 121, a reception controller 122, a decoder 123, and a main controller 124.

The transmission unit 111 may be connected to the reception unit 121 through the line 130. The transmission unit 111 and the reception unit 121 may be referred to as data channels. The transmission unit 111 and the reception unit 121 may correspond to a physical layer and/or a data link layer of an open systems interconnection (OSI) 7-layer model, a network interface layer of a transmission control protocol/internet protocol (TCP/IP) model, or a physical layer of a mobile industry processor interface (MIPI) protocol. The physical layer of the MIPI protocol may be configured according to various predetermined specifications such as D-PHY, C-PHY, and M-PHY. Hereinafter, embodiments in which the transmission unit 111 and the reception unit 121 are configured according to a D-PHY specification of the physical layer of the MIPI protocol will be exemplarily described.

The transmission controller 112 and the reception controller 122 may correspond to a network layer and/or a transport layer of the OSI 7-layer model, an internet layer and/or a transport layer of the TCP/IP model, or a protocol layer of the MIPI protocol. The protocol layer of the MIPI protocol may be configured according to various predefined specifications such as a display serial interface (DSI) and a camera serial interface (CSI). Hereinafter, embodiments in which the transmission controller 112 and the reception controller 122 are configured according to a DSI specification of the protocol layer of the MIPI protocol will be exemplarily described.

The main controller 124 may correspond to a session layer, a presentation layer, and/or an application layer of the OSI 7-layer model, an application layer of the TCP/IP model, or an application layer of the MIPI protocol. Hereinafter, embodiments in which the main controller 124 corresponds to the application layer of the MIPI protocol will be exemplarily described.

According to an embodiment, the transmission unit 111, the transmission controller 112, and the encoder 113 may be separated from each other in terms of hardware, or two or more of the transmission unit 111, the transmission controller 112, and the encoder 113 may be integrated with each other in terms of hardware. According to an alternative embodiment, the transmission unit 111, the transmission controller 112, and the encoder 113 may be separated from each other in terms of software, or two or more of the transmission unit 111, the transmission controller 112, and the encoder 113 may be integrated with each other in terms of software. The transmitter 110 may be configured as (or defined by) a part (hardware or software) of another controller (e.g., an application processor (AP), a graphics processing unit (GPU), a central processing unit (CPU), etc.), and may be configured as independent hardware (e.g., a transmission-only integrated circuit (IC)).

According to an embodiment, the reception unit 121, the reception controller 122, the decoder 123, and the main controller 124 may be separated from each other in terms of hardware, and two or more of the reception unit 121, the reception controller 122, the decoder 123, and the main controller 124 may be integrated with each other in terms of hardware. According to an alternative embodiment, the reception unit 121, the reception controller 122, the decoder 123, and the main controller 124 may be separated from each other in terms of software, and two or more of the reception unit 121, the reception controller 122, the decoder 123, and the main controller 124 may be integrated with each other in terms of software. The receiver 120 may be configured as a part (hardware or software) of another controller (e.g., a timing controller (TCON), a TCON-embedded driver (TED), a driver IC (D-IC), etc.), and may be configured as independent hardware (e.g., a reception-only IC).

The transmission controller 112 may provide second data DT2 including a payload to the encoder 113. The payload may be effective data to be transmitted. The payload may include variable values rather than a predetermined pattern. The encoder 113 may encode the second data DT2 to generate second encoded data EDT2 including the encoded payload, and provide the second encoded data EDT2 to the transmission unit 111. The transmission unit 111 may generate the clock-embedded data CEDT based on the second encoded data EDT2, and transmit the clock-embedded data CEDT through the line 130. The transmission unit 111 may add another data to the second encoded data EDT2 according to a predetermined protocol to generate the clock-embedded data CEDT.

The reception unit 121 may sample the clock-embedded data CEDT to generate first encoded data EDT1 including the encoded payload. The reception unit 121 may generate a clock signal by using the clock-embedded data CEDT, and sample the clock-embedded data CEDT based on the clock signal. In an embodiment, for example, the reception unit 121 may include a clock data recovery (CDR) circuit. The reception unit 121 may provide the first encoded data EDT1 to the decoder 123. The decoder 123 may decode the first encoded data EDT1 to generate first data DT1 including the payload, and provide the first data DT1 to the reception controller 122.

The reception unit 121 may sample the clock-embedded data CEDT to generate a control signal HS used according to the protocol. The reception unit 121 may provide the control signal HS to the reception controller 122. According to an embodiment, the receiver 120 may further include a delay unit, and the delay unit may delay the control signal HS by a decoding time and provide the delayed control signal HS to the reception controller 122. In such an embodiment, the decoding time may be a time used for the decoder 123 to decode the first encoded data EDT1 to generate the first data DT1.

The main controller 124 may output the error flag ER_FG corresponding to the clock embedding-related error.

Figure 2:
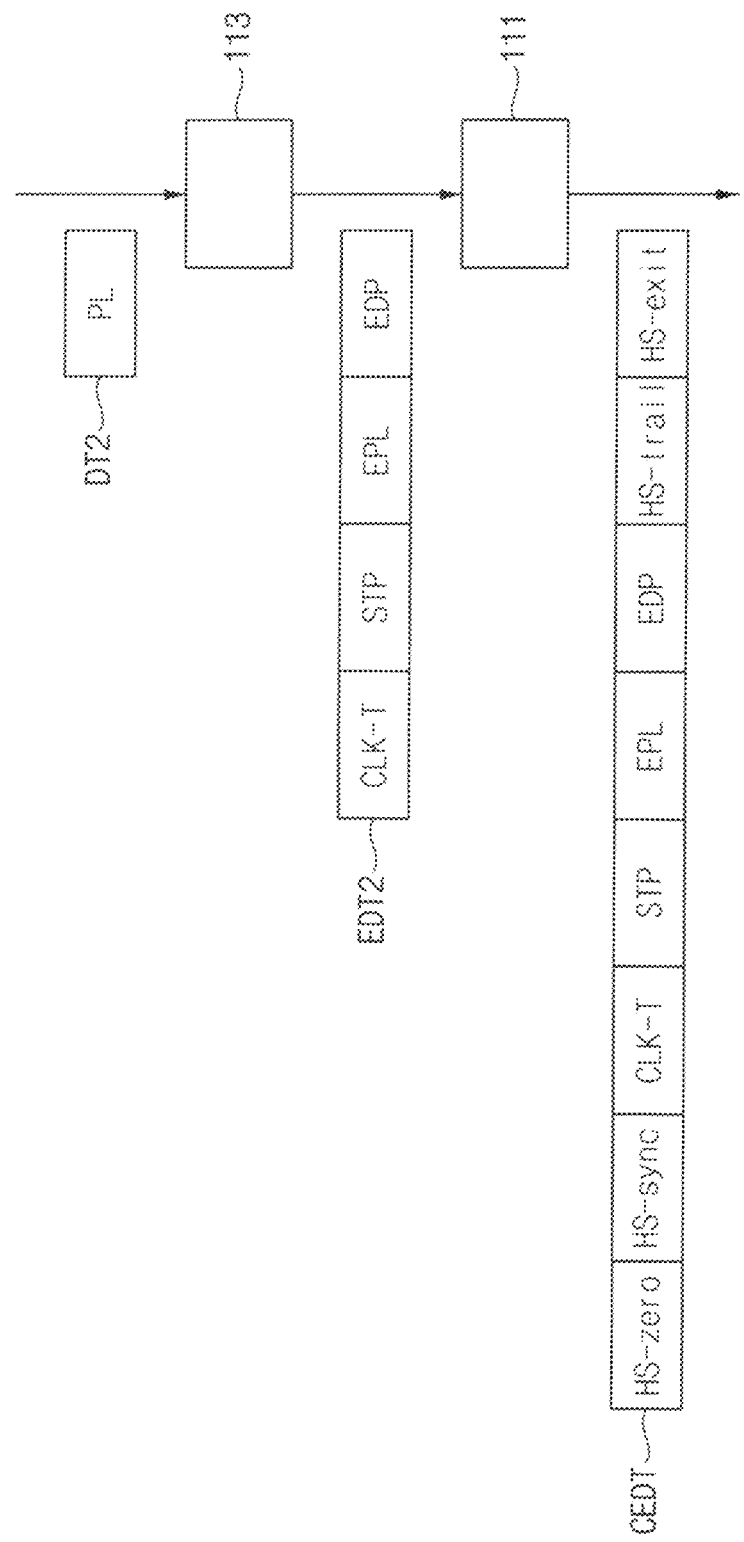
FIG. 2 is a view for describing an operation of a transmitter according to an embodiment of the disclosure.

FIG. 2 is a view for describing an operation of a transmitter 110 according to an embodiment of the disclosure.

Referring to FIG. 2, in an embodiment, the encoder 113 may receive the second data DT2 including a payload PL. The encoder 113 may encode the payload PL to generate an encoded payload EPL, and add data before and after the encoded payload EPL to generate the second encoded data EDT2. In an embodiment, for example, the second encoded data EDT2 may sequentially include a clock training pattern CLK-T, a start pattern STP, the encoded payload EPL, and an end pattern EDP.

The clock training pattern CLK-T may include clock information. The receiver 120 may generate a clock signal having a specific frequency and a specific phase by using the clock information. The frequency and the phase of the clock signal generated by the clock data recovery circuit of the receiver 120 may be undesirably changed by an external factor (noise, a temperature, etc.). The receiver 120 may correct the frequency and the phase of the clock signal by using the clock training pattern CLK-T. According to an embodiment, the clock training pattern CLK-T may be a pattern in which one one and one zero are alternately repeated (e.g., 01010101 . . . ). According to an alternative embodiment, the clock training pattern CLK-T may include repeating units of a plurality of consecutive zeros and a plurality of consecutive ones (e.g., 0000111100001111 . . . ). According to embodiments, frequency information and phase information represented by the clock training pattern CLK-T may vary according to the number of consecutive zeros or the number of consecutive ones.

The start pattern STP may be a pattern for indicating the start of transmission of the encoded payload EPL. The start pattern STP may be a pattern that may not be included that is, prohibited from being used) in the encoded payload EPL. In an embodiment, for example, the start pattern STP may be configured as 24b'011100_000000_111111_110001'.

The encoded payload EPL may include the clock information. In an embodiment, for example, where the encoded payload EPL includes many consecutive zeros or many consecutive ones, the signal may have less transition, so that the phase of the clock signal may not be sufficiently corrected in the reception unit 121, and thus a skew of the clock signal may be caused. Therefore, the encoder 113 may encode the payload PL in a way such that the encoded payload EPL may have sufficiently many transitions (a change from 0 to 1 or a change from 1 to 0) as compared with the payload PL. In an embodiment, the encoder 113 may encode the payload PL in a way such that the encoded payload EPL may periodically have bits having a specific pattern.

The end pattern EDP may be a pattern for indicating the end of transmission of the encoded payload EPL. In an embodiment, for example, the end pattern EDP may be configured as 24b'011100_111111_000000_110001'. The end pattern EDP may be a pattern that may not be included (that is, prohibited from being used) in the encoded payload EPL.

The transmission unit 111 may receive the second encoded data EDT2 including the encoded payload EPL. The transmission unit 111 may add and transmit another data before and after the second encoded data EDT2 according to the predetermined protocol. In an embodiment, for example, where the predetermined protocol is the MIPI protocol, the transmission unit 111 may sequentially transmit a first pattern HS-zero, a second pattern HS-sync, the second encoded data EDT2, a third pattern HS-trail, and a fourth pattern HS-exit.

The first pattern HS-zero may be a pattern for indicating a waiting period after entering a high-speed mode from a low-power mode. In an embodiment, for example, the first pattern HS-zero may be a pattern in which zero is repeated. The second pattern HS-sync may be a pattern for indicating the start of transmission of the second encoded data EDT2. In an embodiment, for example, the second pattern HS-sync may have a value of OxB8h or a value of 00011101. The third pattern HS-trail may be a pattern for indicating the end of transmission of the second encoded data EDT2. The third pattern HS-trail may be a pattern in which a value opposite to last data of the second encoded data EDT2 is repeated. In an embodiment, for example, when the last data (bit) of the second encoded data EDT2 is 0, the third pattern HS-trail may be a pattern in which one is repeated. The fourth pattern HS-exit may be a pattern for indicating the end of the high-speed mode and the start of the low-power mode.

Figure 3:
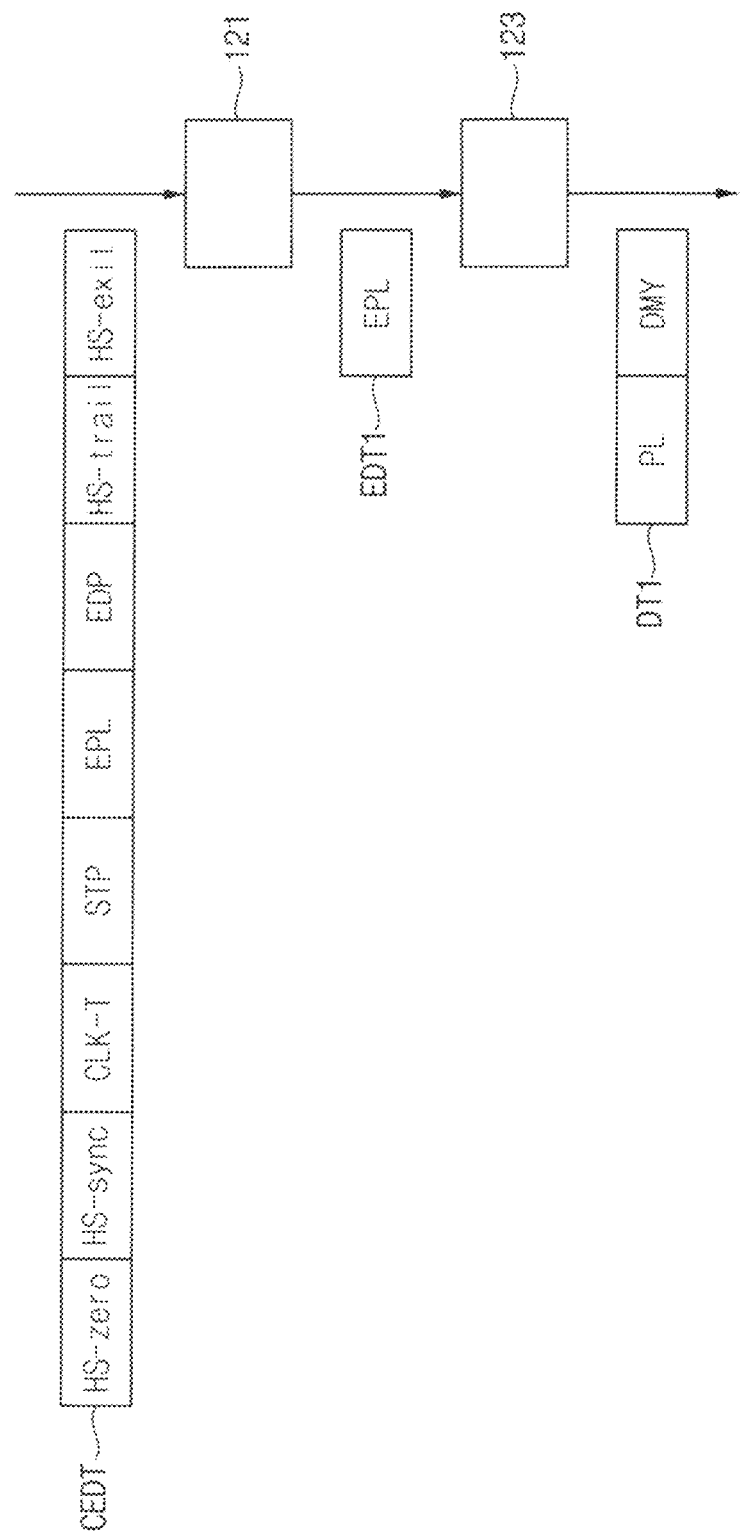
FIG. 3 is a view for describing an operation of a receiver according to an embodiment of the disclosure.

FIG. 3 is a view for describing an operation of a receiver 120 according to an embodiment of the disclosure.

Referring to FIG. 3, in an embodiment, the reception unit 121 may sample the clock-embedded data CEDT to provide the first encoded data EDT1 including the encoded payload EPL to the decoder 123.

The decoder 123 may decode the first encoded data EDT1 (i.e., the encoded payload EPL) to generate the first data DT1, and provide the first data DT1 to the reception controller 122. The first data DT1 may include the payload PL and a dummy pattern DMY.

The dummy pattern DMY may be encoded in advance by the encoder 113 to be embedded in the encoded payload EPL, or may be added by the decoder 123. The dummy pattern DMY may be data in which an identical value is repeated. In an embodiment, for example, when a last value of the payload PL is 0, the dummy pattern DMY may be data in which one is repeated, and when the last value of the payload PL is 1, the dummy pattern DMY may be data in which zero is repeated.

FIG. 4 is a table showing errors defined in an MIPI D-PHY & DSI standard specification.

Referring to FIG. 4, when an error defined in an MIPI D-PHY & DSI standard specification occurs, the receiver 120 may transmit an error signal to the transmitter 110. In an embodiment, for example, the error signal may be a 16-bit signal, and a state error may be preset for each bit.

In an embodiment, for example, a bit in an address 0 of the error signal may indicate an occurrence state of a start-of-transmission (SoT) error, and the SoT error may be an error that occurs when transmission is performed without conforming to a protocol specified in an MIPI alliance.

In an embodiment, for example, the bit in the address 1 of the error signal may indicate an occurrence state of an SoT synchronization error. When a state error corresponding to each address is detected, a bit of the corresponding address may be 1, and when the state error corresponding to each address is not detected, the bit of the corresponding address may be 0.

FIG. 5 is a table showing clock embedding-related errors.

Referring to FIG. 5, an embodiment of the clock embedding-related error may include at least one of a loss-of-lock error, an initialization error, a start pattern error (STP error), an end pattern error (EDP error), and an encoding key error. The clock embedding-related error may refer to an error that may occur in a scheme of embedding clock information in data, and may not be included in an error defined in the MIPI D-PHY & DSI standard specification described above.

The loss-of-lock error may indicate a state in which the clock data recovery (CDR) circuit is out of a locked state without normally restoring the clock signal during a high speed data transmission (HSDT) operation. The initialization error may indicate a state in which the clock data recovery circuit is not normally locked even though the clock data recovery circuit has terminated an initialization operation based on the clock training pattern CLK-T.

The start pattern error may indicate a case in which the start pattern STP is not normally input or a case in which an error occurs during a data restoration (e.g., clock data restoration) process even though the start pattern STP has been normally input. The end pattern error may indicate a case in which the end pattern EDP is not normally input.

The encoding key error may indicate a case in which an input encoding key is a prohibited pattern that may not be generated based on an encoding protocol.

Figure 6:
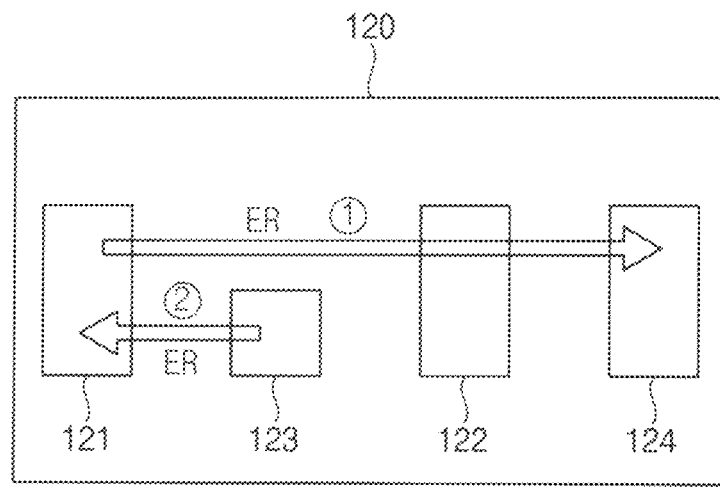
FIG. 6 is a view for describing detection and transmission of a clock embedding-related error according to an embodiment of the disclosure.

FIG. 6 is a view for describing detection and transmission of a clock embedding-related error ER according to an embodiment of the disclosure.

Referring to FIG. 6, in an embodiment, the reception unit 121 and the decoder 123 may detect a clock embedding-related error ER. According to an embodiment, the reception unit 121 may detect at least one selected from the loss-of-lock error, the initialization error, the start pattern error, and the end pattern error, and the decoder 123 may detect the encoding key error.

The clock embedding-related error ER detected by the reception unit 121 may be transmitted to the main controller 124 through the reception controller 122, and the clock embedding-related error ER detected by the decoder 123 may be transmitted to the main controller 124 through the reception unit 121 and the reception controller 122. In such an embodiment, the clock embedding-related error ER detected by the reception unit 121 may be transmitted to the main controller 124 through a path passing through the reception controller 122 (①), and the clock embedding-related error ER detected by the decoder 123 may be transmitted to the main controller 124 through a path passing through the reception unit 121 and the reception controller 122 (①+②).

Figure 7:
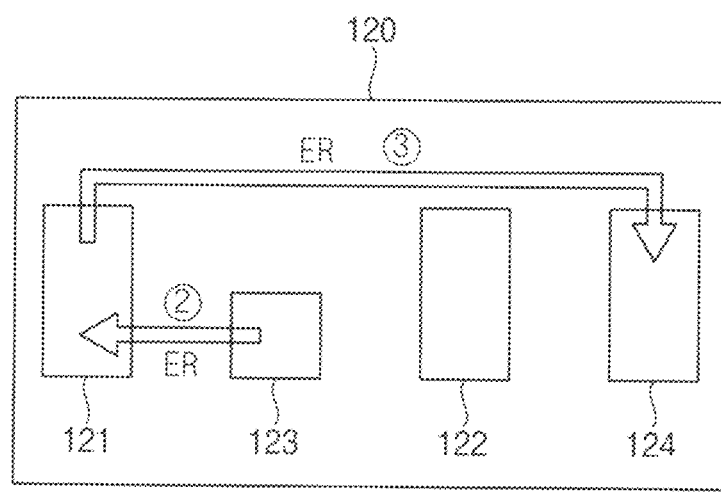
FIG. 7 is a view for describing detection and transmission of a clock embedding-related error according to an embodiment of the disclosure.

FIG. 7 is a view for describing detection and transmission of a clock embedding-related error ER according to an embodiment of the disclosure.

Referring to FIG. 7, in an embodiment, the clock embedding-related error ER detected by the reception unit 121 may be directly transmitted to the main controller 124, and the clock embedding-related error ER detected by the decoder 123 may be transmitted to the main controller 124 through the reception unit 121.

In such an embodiment, the clock embedding-related error ER detected by the reception unit 121 may be transmitted to the main controller 124 through a path that does not pass through the reception controller 122 (③), and the clock embedding-related error ER detected by the decoder 123 may be transmitted to the main controller 124 through a path that passes through the reception unit 121 and does not pass through the reception controller 122 (②+③).

Figures 8, 9:
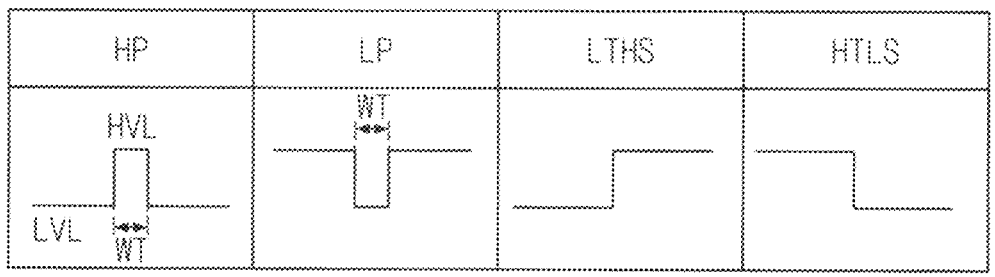
FIG. 8 is a table for describing masking of the clock embedding-related error according to an embodiment of the disclosure.
FIG. 9 is a table for describing error flags according to embodiments of the disclosure.

FIG. 8 is a table for describing masking of the clock embedding-related error according to an embodiment of the disclosure.

Referring to FIG. 8, at least one selected from clock embedding-related errors may be selectively masked. According to an embodiment, at least one selected from the loss-of-lock error, the initialization error, the start pattern error, the end pattern error, and the encoding key error may be selectively masked.

In an embodiment, for example, as shown in FIG. 8, in a case where the loss-of-lock error is selectively masked, the main controller 124 may not output the error flag ER_FG even when the loss-of-lock error is detected by the reception unit 121. In an embodiment, as shown in FIG. 8, in a case where the initialization error is not selectively masked, the main controller 124 may output the error flag ER_FG when the initialization error is detected by the reception unit 121.

FIG. 9 is a table for describing error flags ER_FG according to embodiments of the disclosure.

Referring to FIG. 9, in an embodiment, the error flag ER_FG may include one of a pulse HP of a high voltage level HVL, a pulse LP of a low voltage level LVL, a signal LTHS increasing from the low voltage level LVL to the high voltage level HVL, and a signal HTLS decreasing from the high voltage level HVL to the low voltage level LVL. The high voltage level HVL in the signal LTHS increasing from the low voltage level LVL to the high voltage level HVL may indicate occurrence of the clock embedding-related error, and the low voltage level LVL in the signal HTLS decreasing from the high voltage level HVL to the low voltage level LVL may indicate occurrence of the clock embedding-related error.

According to an embodiment, a width WT of the pulse HP of the high voltage level HVL and a width WT of the pulse LP of the low voltage level LVL may be selectively adjusted. A width and/or a frequency of the clock signal of the transmitter 110 may be different from a width and/or a frequency of the clock signal of the receiver 120, or a setting for detecting the error flag ER_FG of the transmitter 110 may be different from a setting of generating the error flag ER_FG of the receiver 120. Accordingly, the width WT of the pulse HP of the high voltage level HVL and the width WT of the pulse LP of the low voltage level LVL may be increased or decreased so that the error flag ER_FG generated by the receiver 120 may be detected by the transmitter 110.

Figure 10:
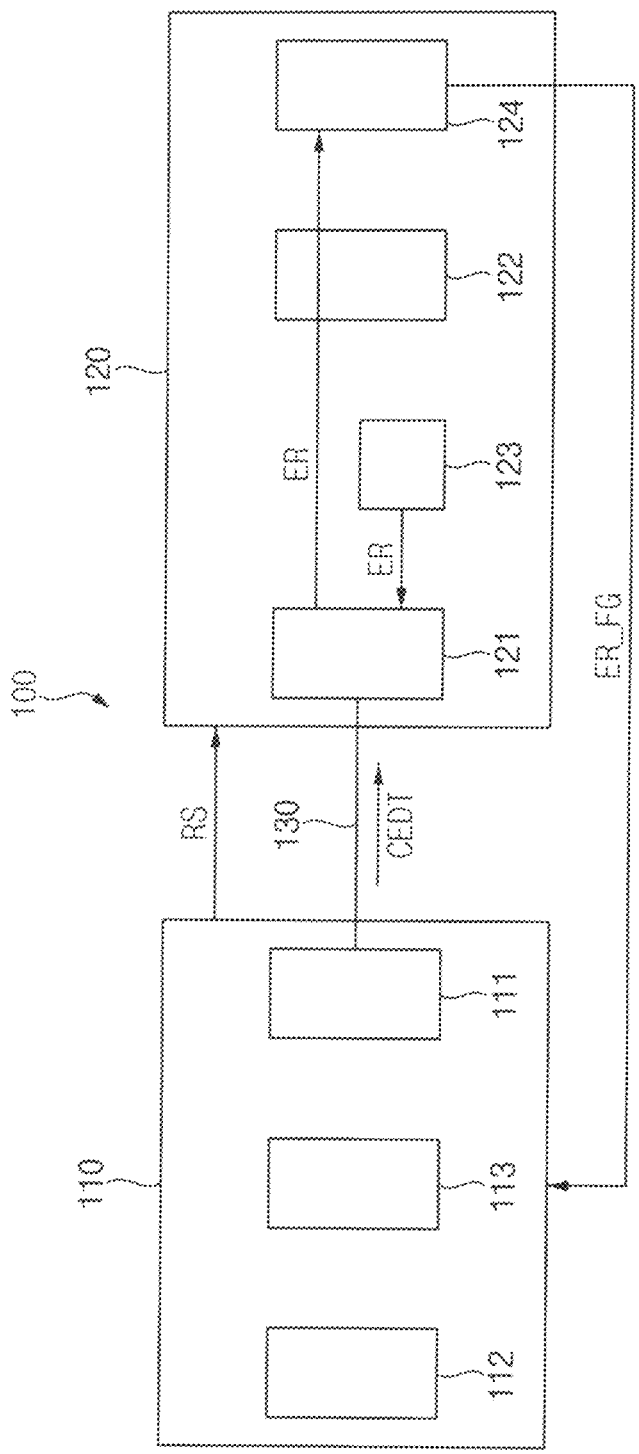
FIG. 10 is a view for describing a method of driving a transceiver according to an embodiment of the disclosure.

FIG. 10 is a view for describing a method of driving a transceiver 100 according to an embodiment of the disclosure.

Referring to FIG. 10, in an embodiment of a method of driving a transceiver 100, a transmitter 110 may transmit clock-embedded data CEDT to a receiver 120 through a line 130.

In such an embodiment, the receiver 120 may detect a clock embedding-related error ER from the clock-embedded data CEDT. A reception unit 121 and a decoder 123 may detect the clock embedding-related error ER including at least one selected from a loss-of-lock error, an initialization error, a start pattern error, an end pattern error, and an encoding key error. According to an embodiment, the reception unit 121 may detect at least one selected from the loss-of-lock error, the initialization error, the start pattern error, and the end pattern error, and the decoder 123 may detect the encoding key error.

In such an embodiment, the reception unit 121 and the decoder 123 may transmit the clock embedding-related error ER to a main controller 124. According to an embodiment, the clock embedding-related error ER detected by the reception unit 121 may be transmitted to the main controller 124 through a reception controller 122, and the clock embedding-related error ER detected by the decoder 123 may be transmitted to the main controller 124 through the reception unit 121 and the reception controller 122. According to an alternative embodiment, the clock embedding-related error ER detected by the reception unit 121 may be directly transmitted to the main controller 124, and the clock embedding-related error ER detected by the decoder 123 may be transmitted to the main controller 124 through the reception unit 121.

In such an embodiment, the main controller 124 may output an error flag ER_FG corresponding to the clock embedding-related error ER to the transmitter 110. The error flag ER_FG may include one of a pulse of a high voltage level, a pulse of a low voltage level, a signal increasing from the low voltage level to the high voltage level, and a signal decreasing from the high voltage level to the low voltage level.

According to an embodiment, a width of the pulse of the high voltage level and a width of the pulse of the low voltage level may be selectively adjusted so that the error flag ER_FG may be detected by the transmitter 110.

According to an embodiment, at least one selected from the loss-of-lock error, the initialization error, the start pattern error, the end pattern error, and the encoding key error may be selectively masked. Accordingly, even when a clock embedding-related error ER that is selectively masked occurs, the main controller 124 may not output the error flag ER_FG.

In such an embodiment, the transmitter 110 may transmit a reset signal RS to the receiver 120 based on the error flag ER_FG. The receiver 120 may be initialized or may initiate reception of the clock-embedded data CEDT based on the reset signal RS transmitted from the transmitter 110.

FIG. 11 is a block diagram showing a display device 200 and a processor 300 according to an embodiment of the disclosure.

Referring to FIG. 11, an embodiment of a display device 200 may include a display panel 210, a scan driver 220, and a display panel driver 230. The display panel driver 230 may include a data driver 232 and a timing controller 234.

The display panel 210 may display an image. The display panel 210 may include a plurality of pixels PX. The pixels PX may be substantially arranged in a matrix shape. Each of the pixels PX may emit a light, and the display panel 210 may display an image in which lights emitted from the pixels PX are combined. According to an embodiment, each of the pixels PX may emit a red light, a green light, a blue light, or a white light.

The scan driver 220 may generate scan signals SS based on a scan control signal SCS. The scan driver 220 may provide the scan signals SS to the pixels PX. According to an embodiment, the scan driver 220 may be mounted on the display panel 210 in the form of a circuit.

The data driver 232 may generate data voltages VDT based on a data control signal DCS and image data ID. The data driver 232 may generate the data voltages VDT corresponding to the image data ID. The data driver 232 may provide the data voltages VDT to the pixels PX.

The timing controller 234 may control driving of the scan driver 220. The timing controller 234 may generate the scan control signal SCS based on a control signal. The control signal may include a clock signal, a horizontal synchronization signal, a vertical synchronization signal, and the like. The timing controller 234 may provide the scan control signal SCS to the scan driver 220.

The timing controller 234 may control driving of the data driver 232. The timing controller 234 may generate the data control signal DCS and the image data ID based on the control signal and input image data, and provide the data control signal DCS and the image data ID to the data driver 232.

According to an embodiment, the display panel driver 230 may be a timing controller-embedded driver (TED) in which the timing controller 234 is embedded in the data driver 232. In embodiments described above, the display panel driver 230 may include the receiver 120 described above.

The processor 300 may be one of an application processor (AP), a graphics processing unit (GPU), and a central processing unit (CPU). The processor 300 may include the transmitter 110 described above.

The transceiver and the display device according to the embodiments may be applied to a display device included in a computer, a notebook, a mobile phone, a smart phone, a smart pad, a PMP, a PDA, an MP3 player, or the like.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A transceiver comprising:
   a transmitter which transmits clock-embedded data through a line, wherein the clock-embedded data includes a clock training pattern, a start pattern, an encoded payload, and an end pattern, which are arranged in a listed order of the clock training pattern, the start pattern, the encoded payload, and the end pattern in the clock-embedded data; and
   a receiver which receives the clock-embedded data, detects a clock embedding-related error from the clock-embedded data, and outputs an error flag corresponding to the clock embedding-related error to the transmitter,
   wherein the clock training pattern includes clock information,
   the start pattern is a pattern for indicating a start of transmission of the encoded payload,
   the encoded payload includes the clock information,
   the end pattern is a pattern for indicating an end of transmission of the encoded payload,
   the receiver generates a clock signal having a specific frequency and a specific phase by using the clock information, and
   the transmitter is included in a processor and the receiver is included in a timing controller which controls driving of a data driver.

2. The transceiver of claim 1, wherein the clock embedding-related error is not included in errors defined in a mobile industry processor interface (MIPI) D-PHY & DSI standard specification.

3. The transceiver of claim 1, wherein the clock embedding-related error includes at least one selected from a loss-of-lock error, an initialization error, a start pattern error, an end pattern error, and an encoding key error.

4. The transceiver of claim 3, wherein the at least one selected from the loss-of-lock error, the initialization error, the start pattern error, the end pattern error, and the encoding key error is selectively masked.

5. The transceiver of claim 1, wherein the receiver includes:
   a reception unit which samples the clock-embedded data to generate first encoded data and a control signal;
   a decoder which decodes the first encoded data to generate first data;
   a reception controller which receives the control signal and the first data; and
   a main controller which outputs the error flag.

6. The transceiver of claim 5, wherein the reception unit and the decoder detect the clock embedding-related error.

7. The transceiver of claim 6, wherein the clock embedding-related error detected by the reception unit is transmitted to the main controller through the reception controller, and
   the clock embedding-related error detected by the decoder is transmitted to the main controller through the reception unit and the reception controller.

8. The transceiver of claim 6, wherein the clock embedding-related error detected by the reception unit is directly transmitted to the main controller, and the clock embedding-related error detected by the decoder is transmitted to the main controller through the reception unit.

9. The transceiver of claim 5, wherein the transmitter includes:
a transmission controller which generates second data;
an encoder which encodes the second data to generate second encoded data; and
a transmission unit which generates the clock-embedded data based on the second encoded data.

10. The transceiver of claim 1, wherein the error flag includes one of a pulse of a high voltage level, a pulse of a low voltage level, a signal increasing from the low voltage level to the high voltage level, and a signal decreasing from the high voltage level to the low voltage level.

11. The transceiver of claim 10, wherein a width of the pulse of the high voltage level and a width of the pulse of the low voltage level are selectively adjusted.

12. The transceiver of claim 1, wherein the receiver generates a clock signal by using the clock training pattern and the encoded payload.

13. A method of driving a transceiver, the method comprising: transmitting, by a transmitter, clock-embedded data through a line to a receiver, wherein the clock-embedded data includes a clock training pattern, a start pattern, an encoded payload, and an end pattern, which are arranged in a listed order of the clock training pattern, the start pattern, the encoded payload, and the end pattern in the clock-embedded data; detecting a clock embedding-related error from the clock-embedded data; and outputting, by the receiver, an error flag corresponding to the clock embedding-related error to the transmitter, wherein the clock training pattern includes clock information, the start pattern is a pattern for indicating a start of transmission of the encoded payload, the encoded payload includes the clock information, the end pattern is a pattern for indicating an end of transmission of the encoded payload, the receiver generates a clock signal having a specific frequency and a specific phase by using the clock information, and the transmitter is included in a processor and the receiver is included in a timing controller which controls driving of a data driver.

14. The method of claim 13, wherein the clock embedding-related error includes at least one selected from a loss-of-lock error, an initialization error, a start pattern error, an end pattern error, and an encoding key error.

15. The method of claim 14, further comprising:
selectively masking the at least one selected from the loss-of-lock error, the initialization error, the start pattern error, the end pattern error, and the encoding key error.

16. The method of claim 13, wherein the error flag includes one of a pulse of a high voltage level, a pulse of a low voltage level, a signal increasing from the low voltage level to the high voltage level, and a signal decreasing from the high voltage level to the low voltage level.

17. The method of claim 16, further comprising:
selectively adjusting a width of the pulse of the high voltage level and a width of the pulse of the low voltage level.

18. The method of claim 13, further comprising:
transmitting, by the transmitter, a reset signal to the receiver based on the error flag.

19. A display device comprising: a display panel including a plurality of pixels; a display panel driver including a data driver which provides data voltages to the pixels, and a timing controller which controls driving of the data driver; and a receiver which receives clock-embedded data from a transmitter, detects a clock embedding-related error from the clock-embedded data, and outputs an error flag corresponding to the clock embedding-related error to the transmitter, wherein the clock-embedded data includes a clock training pattern, a start pattern, an encoded payload, and an end pattern, which are arranged in a listed order of the clock training pattern, the start pattern, the encoded payload, and the end pattern in the clock-embedded data, wherein the clock training pattern includes clock information, the start pattern is a pattern for indicating a start of transmission of the encoded payload, the encoded payload includes the clock information, the end pattern is a pattern for indicating an end of transmission of the encoded payload, the receiver generates a clock signal having a specific frequency and a specific phase by using the clock information, and the transmitter is included in a processor and the receiver is included in the timing controller.

20. The display device of claim 19, wherein
the display panel driver is a timing controller-embedded driver in which the timing controller is embedded in the data driver, and
the display panel driver includes the receiver.

* * * * *